United States Patent
Chen et al.

(10) Patent No.: US 7,827,292 B2
(45) Date of Patent: Nov. 2, 2010

(54) FLEXIBLE AUTOMATED CONNECTION TO VIRTUAL PRIVATE NETWORKS

(75) Inventors: Yihsiu Chen, Middletown, NJ (US); Mark Jeffrey Foladare, East Brunswick, NJ (US); Shelley B. Goldman, East Brunswick, NJ (US); Thomas Joseph Killian, Westfield, NJ (US); Norman Loren Schryer, New Providence, NJ (US); Kevin Stone, Fair Haven, NJ (US); Roy Philip Weber, Bridgewater, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 2036 days.

(21) Appl. No.: 09/911,061

(22) Filed: Jul. 23, 2001

(65) Prior Publication Data

US 2003/0028650 A1    Feb. 6, 2003

(51) Int. Cl.
*G06F 15/16* (2006.01)
(52) U.S. Cl. .................. 709/229; 709/220; 709/223; 709/230
(58) Field of Classification Search ................. 709/229, 709/223, 220, 230; 713/201
See application file for complete search history.

(56) References Cited

U.S. PATENT DOCUMENTS

| | | |
|---|---|---|
| 5,420,926 A | 5/1995 | Low et al. |
| 5,636,139 A | 6/1997 | McLaughlin et al. |
| 5,671,279 A | 9/1997 | Elgamal |
| 5,812,670 A | 9/1998 | Micali |
| 5,884,270 A | 3/1999 | Walker et al. |
| 5,889,863 A | 3/1999 | Weber |
| 5,961,593 A | 10/1999 | Gabber et al. |
| 6,012,088 A | 1/2000 | Li et al. |
| 6,016,318 A | 1/2000 | Tomoike |
| 6,016,504 A | 1/2000 | Arnold et al. |
| 6,023,510 A | 2/2000 | Epsstein |
| 6,032,118 A | 2/2000 | Tello et al. |
| 6,055,236 A | 4/2000 | Nesset et al. |
| 6,055,518 A | 4/2000 | Franklin et al. |

(Continued)

OTHER PUBLICATIONS

Official Action issued in U.S. Appl. No. 09/910,987, issued Aug. 31, 2006, 5 pages.

(Continued)

*Primary Examiner*—John Follansbee
*Assistant Examiner*—Nghi V Tran
(74) *Attorney, Agent, or Firm*—Hanley, Flight & Zimmerman, LLC

(57) ABSTRACT

A network interface unit is provided for use intermediate a LAN and a public or private network, or a combination of both, for establishing secure links to a VPN gateway. Login by a LAN client with the network interface unit, addressing, authentication, and other configuration operations achieved using a web page-based GUI are applied in establishing tunnels from LAN clients to desired VPN destinations. Illustrative network interface units include a DHCP server and provide encryption-decryption and encapsulation-decapsulation of data packets for communication with VPN nodes. Configuration and connection of a client are further enhanced by a built-in DNS server and other functional servers to provide a high degree of autonomy in establishing connections to a desired VPN gateway via an ISP or other public and/or private network links to. The interface unit then performs required authentication exchanges, and required encryption key exchanges.

6 Claims, 15 Drawing Sheets

U.S. PATENT DOCUMENTS

| | | | |
|---|---|---|---|
| 6,055,575 A | 4/2000 | Paulsen et al. | |
| 6,061,789 A | 5/2000 | Hauser et al. | |
| 6,061,796 A | 5/2000 | Chen et al. | |
| 6,067,568 A | 5/2000 | Li et al. | |
| 6,076,078 A | 6/2000 | Camp et al. | |
| 6,078,586 A | 6/2000 | Dugan et al. | |
| 6,079,020 A * | 6/2000 | Liu | 713/201 |
| 6,081,900 A | 6/2000 | Subramaniam et al. | |
| 6,092,198 A | 7/2000 | Lanzy et al. | |
| 6,101,543 A | 8/2000 | Alden et al. | |
| 6,119,234 A | 9/2000 | Aziz et al. | |
| 6,173,399 B1 * | 1/2001 | Gilbrech | 713/153 |
| 6,195,705 B1 | 2/2001 | Leung | |
| 6,295,556 B1 | 9/2001 | Falcon et al. | |
| 6,324,525 B1 | 11/2001 | Kramer et al. | |
| 6,445,920 B1 | 9/2002 | Pfundstein | |
| 6,460,072 B1 | 10/2002 | Arnold et al. | |
| 6,577,642 B1 | 6/2003 | Fijolek et al. | |
| 6,606,744 B1 | 8/2003 | Mikurak | |
| 6,636,898 B1 * | 10/2003 | Ludovici et al. | 709/250 |
| 6,640,302 B1 | 10/2003 | Subramaniam et al. | |
| 6,693,878 B1 | 2/2004 | Daruwalla et al. | |
| 6,694,437 B1 | 2/2004 | Pao et al. | |
| 6,697,806 B1 | 2/2004 | Cook | |
| 6,697,865 B1 | 2/2004 | Howard et al. | |
| 6,751,729 B1 | 6/2004 | Giniger et al. | |
| 6,795,830 B1 | 9/2004 | Banerjee et al. | |
| 6,909,987 B2 | 6/2005 | Jung | |
| 6,928,479 B1 | 8/2005 | Meyer et al. | |
| 6,965,992 B1 | 11/2005 | Joseph et al. | |
| 7,039,034 B2 | 5/2006 | Dick et al. | |
| 7,055,171 B1 | 5/2006 | Martin et al. | |
| 7,085,277 B1 | 8/2006 | Proulx et al. | |
| 7,418,596 B1 | 8/2008 | Carroll et al. | |
| 7,523,490 B2 | 4/2009 | Guo et al. | |
| 7,631,084 B2 | 12/2009 | Thomas et al. | |
| 2001/0034709 A1 | 10/2001 | Stoifo et al. | |
| 2001/0034758 A1 | 10/2001 | Kikinis | |
| 2001/0037205 A1 | 11/2001 | Joao | |
| 2001/0047387 A1 | 11/2001 | Brockhurst | |
| 2001/0054004 A1 | 12/2001 | Powers | |
| 2001/0056389 A1 | 12/2001 | Fair et al. | |
| 2002/0010679 A1 | 1/2002 | Felsher | |
| 2002/0023004 A1 | 2/2002 | Hollander et al. | |
| 2002/0055989 A1 * | 5/2002 | Stringer-Calvert et al. | 709/220 |
| 2002/0064149 A1 | 5/2002 | Elliott et al. | |
| 2002/0065941 A1 | 5/2002 | Kaan et al. | |
| 2002/0069096 A1 | 6/2002 | Lindoerfer et al. | |
| 2002/0069278 A1 * | 6/2002 | Forslow | 709/225 |
| 2002/0077993 A1 | 6/2002 | Immonen et al. | |
| 2002/0095568 A1 | 7/2002 | Norris et al. | |
| 2002/0112162 A1 | 8/2002 | Cocotis et al. | |
| 2002/0129271 A1 | 9/2002 | Stanaway et al. | |
| 2002/0133722 A1 | 9/2002 | Levanon et al. | |
| 2002/0144144 A1 | 10/2002 | Weiss et al. | |
| 2002/0159463 A1 * | 10/2002 | Wang | 370/401 |
| 2002/0169980 A1 | 11/2002 | Brownell | |
| 2003/0004859 A1 | 1/2003 | Shaw et al. | |
| 2003/0005115 A1 | 1/2003 | Walker et al. | |
| 2003/0055652 A1 | 3/2003 | Nichols et al. | |
| 2003/0217288 A1 | 11/2003 | Guo et al. | |
| 2004/0107286 A1 * | 6/2004 | Larson et al. | 709/229 |
| 2005/0022183 A1 | 1/2005 | Poisson et al. | |

OTHER PUBLICATIONS

Official Action issued in U.S. Appl. No. 09/910,987, issued Dec. 15, 2005, 12 pages.

"DHCP Configuration of IPSecTunnel Mode", Patel et al., Aug. 1st, 2000, http://www.watersprings.org/pub/id/draft-ietf-ipsec-dhcp-04.txt, 2 pages.

"The IPSEC Protocols", http://www.aces.edu/~gparmer/vpn/freeswandocs/ipsec.html, printed Dec. 2, 2005, 2 pages.

"Implementing VPN support", Microsoft, Feb. 28, 2000, http://www.microsoft.com/windows2000/en/advanced/help/cmak ops 41.htm, 2 pages.

"PPPoE Baseline Architecture for the Cisco 6400 UAC:" Advantages and Disadvantages of PPPoE Architecture, http://www.cisco.com/en/US/tech/tk175/tk15/technologies white paper09186a0080093e55.s, 1 page.

Official Action issued in U.S. Appl. No. 10/244,192, issued Nov. 2, 2005, 15 pages.

Official Action issued in U.S. Appl. No. 10/244,192, issued May 19, 2006, 12 pages.

Notice of Allowance issued in U.S. Appl. No. 09/910,987, issued Apr. 27, 2010, 7 pages.

Oficial Action issued in U.S. Appl. No. 11/280,931, issued Apr. 19, 2007, 10 pages.

Oficial Action issued in U.S. Appl. No. 10/244,359, issued Jul. 22, 2010, 23 pages.

Oficial Action issued in U.S. Appl. No. 10/244,359, issued Mar. 14, 2006, 19 pages.

Oficial Action issued in U.S. Appl. No. 10/244,359, issued Aug. 24, 2006, 18 pages.

Oficial Action issued in U.S. Appl. No. 10/244,192, issued Dec. 19, 2006, 13 pages.

Notice of Allowance issued by the United States Patent and Trademark Office in connection with U.S. Appl. No. 09/910,987 on Sep. 7, 2010, 4 pages.

* cited by examiner

*FIG. 5*

| DEVICE ID | DEVICE TYPE |
|---|---|
| IP CONFIG (STATIC/DHCP) ||
| TELCO LOGINS ||
| TUNNEL ID ||
| ⋮ ||
| WEB SERVER PAGES ||
| GUI INFO ||
| DNS INFO ||
| DHCP INFO ||
| PPP INFO ||

FIG. 9

MAIN MENU

STATUS

DISCONNECT

VIEW SYSLOG

CLOSE

{SYSTEM MESSAGE} AS OF {PC TIME}
{ERROR MESSAGE}

SELECT A CONNECTION FROM THE LIST OR CREATE A NEW CONNECTION.

AT&T WORLDNET
@HOME
UUU • • • UU
VVV • • • VV
WWW • • • WW
XXX • • • XX
YYY • • • YY
ZZZ • • • ZZ

DIAL-UP CONNECTION - {NAME OF CONNECTION}

USER ID: {USER ID}   PASSWORD: **********

PHONE NUMBER TO DIAL: 800-555-1234

- OPTION: DIAL  9   TO ACCESS AN OUTSIDE LINE.

- OPTION: DIAL  *70   TO DISABLE CALL WAITING.

CONNECT   EDIT   COPY   DELETE

FIG. 14

NEW CONNECTION

Step 1: Name

WHAT IS THE NAME OF THIS CONNECTION? ☐

Step 2: Connection Type

○ DIAL-UP CONNECTION
A DIAL-UP CONNECTION USES A MODEM AND OBTAINS CONNECTION BY DIALING INTO A NUMBER.

○ NETWORK CONNECTION
A NETWORK CONNECTION USUALLY CONNECTS THROUGH LOCAL AREA NETWORK (LAN), CABLE MODEM, OR DSL.

Step 3: Specific Information

FOR DIAL UP CONNECTION • • •

USER ID: ☐
PASSWORD: ☐
○ *USE STANDARD DIAL-UP CONFIGURATION*
PHONE NUMBER TO DIAL: ☐
- OPTION: DIAL ☐ TO ACCESS ON OUTSIDE LINE.
- OPTION: DIAL ☐ TO DISABLE CALL WAITING.
- *OR* -
○ *USE CUSTOMIZED MODEM DIALING STRING*
☐

FOR NETWORK CONNECTION • • •

⊙ *USE DHCP*
HOST: ☐
- *OR* -
○ *USE FIXED IP ADDRESS*
IP ADDRESS: ☐
MASK: ☐
GATEWAY: ☐

[ SAVE ]  [ START OVER ]  [ CANCEL ]

FIG. 15

EDIT CONNECTION

NAME: {NAME}   DIAL-UP CONNECTION

USER ID: POPULATED
PASSWORD:

⦿ USE STANDARD DIAL-UP CONFIGURATION

PHONE NUMBER TO DIAL: 800-555-1234

- OPTION: DIAL [9] TO ACCESS AN OUTSIDE LINE.
- OPTION: DIAL [*70] TO DISABLE CALL WAITING.

- OR -
○ USE CUSTOMIZED DIALING STRING

SAVE   START OVER   CANCEL

SAVE AS  >>

FIG. 16

EDIT CONNECTION

NAME:
{NAME}

NETWORK CONNECTION

⦿ USE DHCP

CLIENT:

- OR -
○ USE CUSTOMIZED DIALING STRING

IP ADDRESS: 123.45.678.90
MASK: 255.254.253.252
GATEWAY: 123.4.56.789

SAVE  START OVER  CANCEL

SAVE AS >>

FLEXIBLE AUTOMATED CONNECTION TO VIRTUAL PRIVATE NETWORKS

RELATED APPLICATIONS

The present application is related to concurrently filed non-provisional application by the applicants of the present application, which related application is entitled System for Automated Connection to Virtual Private Networks, and is assigned to the assignee of the present invention, and which related application is hereby incorporated by reference as if set forth in its entirety herein.

FIELD OF THE INVENTION

The present invention relates to data networks, and, more particularly, to automated access to data networks. Still more particularly, the present invention relates to flexible automated access to virtual private networks based on selectable access criteria.

BACKGROUND OF THE INVENTION

Recent years have witnessed a surge in popularity of the Internet. Access and increased use by home users, small businesses, large corporations, universities and government agencies continues to increase at a rapid rate.

Generally speaking, the Internet may be considered as the interconnection of a any large number of local, regional or global networks interconnected using one of several global backbone communications routes, with access provided by Internet service providers (ISPs) or direct network-to-network connection (typically for large users). Access to ISP networks is typically accomplished using the well-known Internet Protocol (IP) through ISP points of presence (POPs) in many different locations around the country, thus permitting customers to have local dial-in access or a short leased-line access. After gaining access to an ISP users have access to the Internet, usually through a hierarchy of local access providers and other network service providers. Increasingly, access is available through a variety of broadband access technologies, such as "always-on" cable and DSL modems connected over CATV cable facilities or local telephone lines at data rates many times higher than dial-up telephone links.

Another aspect of evolving networking needs of corporate and other data communications users relates to the mobility of employees, customers and suppliers requiring access to headquarters or branch locations of an enterprise. Home office and temporary access to corporate networks, including access from hotels and offices of customers, suppliers and others is of increasing importance to many network users and operators.

Such widespread use and access, including temporary or mobile access, has raised concerns by many for the security of transmissions over the public links of the Internet. Large corporations with extensive networking needs have in many cases preferred private networks for their typically large volumes of data to many different locations. It has proven relatively easier to provide security measures for insuring the integrity and privacy of communications between stations or nodes in private networks using a variety of data checking and encryption technologies.

For example, secure private networks are typically protected by firewalls that separate the private network from a public network. Firewalls ordinarily provide some combination of packet filtering, circuit gateway, and application gateway technology, insulating the private network from unwanted communications with the public network.

Encryption in private networks is illustratively performed using an encryption algorithm using one or more encryption keys, with the value of the key determining how the data is encrypted and decrypted. So-called public-key encryption systems use a key pair for each communicating entity. The key pair consists of an encryption key and a decryption key. The two keys are formed such that it is not feasible to generate the decryption key from the encryption key. Further, in public-key cryptography, each entity makes its encryption key public, while keeping its decryption key secret. When sending a message to node A, for example, the transmitting entity uses the public key of node A to encrypt the message; the message can only be decrypted by node A using its private key. Many other encryption algorithms are described in the literature. See, for example B. Schneier, *Applied Cryptography—Protocols, Algorithms, and Source Code in C*, John Wiley and Sons, New York, 1994.

Information regarding encryption keys and the manner of using them to encrypt data for a particular secure communications session is referred to as key exchange material. Key exchange material illustratively includes keys to be used and a time duration for which each key is valid. Both end stations in an end-to-end path must know key exchange material before encrypted data can be exchanged in a secure communications session. The manner of making key exchange material known to communicating stations for a given secure communications session is referred to as session key establishment.

Many of the integrity and privacy safeguards long employed in private networks have not always been available in networks involving at least some public network links. Yet, smaller users and, increasingly, large users have sought techniques for safely employing public networks to meet all or part of their communications network needs. Among the techniques employed to provide varying degrees of approximation to security advantages available in private networks while employing public links are so-called virtual private networks or VPNs.

VPNs provide secure communications between network nodes by encapsulating and encrypting messages. Encapsulated messages are said to traverse a tunnel in a public network, and are encapsulated by a process of tunneling. Tunnels using encryption provide protected communications between users at network nodes separated by public network links, and may also be used to provide communications among a selected or authorized subset of users in a private network.

In a VPN, a tunnel endpoint is the point at which any encryption/decryption and encapsulation/de-encapsulation (sometimes called decapsulation) is provided in a tunneling process. In existing systems, tunnel end points are predetermined network layer addresses. The source network layer address in a received message is used to determine the credentials of an entity that requests establishment of a tunnel connection. For example, a tunnel server uses the source network layer address to determine whether a requested tunnel connection is authorized. The source network layer address is also used to determine a cryptographic key or keys to be used to decrypt received messages.

Existing tunneling processing is typically performed by encapsulating encrypted network layer packets (also referred to as frames) at the network layer. Such systems provide network layer within network layer encapsulation of encrypted messages. Tunnels in existing systems are typically between firewall nodes that have statically allocated IP addresses. In such existing systems, the statically allocated IP address of the firewall is the address of a tunnel end point within the firewall. Existing systems that connect local-area networks (LANs) fail to provide a tunnel that can perform authorization for a node that must dynamically allocate its network layer address. This is especially problematic for a user wishing to establish a tunnel in a mobile computing environment for which an JSP allocates a dynamic IP address.

U.S. Pat. No. 6,101,543 issued Aug. 8, 2000 to K. H. Alden, et al., discloses techniques seeking to establish a tunnel using a virtual or so-called pseudo network adapter. In particular, Alden, et al., seeks to have a pseudo network adapter appear to the communications protocol stack as a physical device for providing a virtual private network having a dynamically determined end point to support a user in a mobile computing environment. The pseudo network adapter disclosed in Alden, et al. seeks to receive packets from the communications protocol stack and pass received packets back through the protocol stack either to a user or for transmission.

An important IP layer security architecture and protocol for use in networking over IP networks such as the Internet is described in S. Kent and R. Atkinson, "Security Architecture for the Internet Protocol," IETF Network Working Group Request for Comments 2401, Nov. 1998. The so-called IPsec protocols and processes described in that IETF document have proven useful in a number of contexts.

Despite growing experience with connecting computers or local networks to other networks, including the Internet, many users experience difficulties in establishing reliable, secure connections under a variety of circumstances. Such difficulties arise, in part, because many configuration variables must be taken into account, such as whether the connection is for a single computer or for a local area network (LAN), whether a location is to be identified by a dynamic or static IP address, as well as the type of connection required. Thus, for example, a traveling employee may require access to a corporate headquarters network using a dial-up telephone line from a hotel, or a leased line connection from a supplier location. Many home or home office users will connect to the Internet through a dial-up line using an analog modem, while others will employ cable or DSL modem links. Each connection type and location may require specific configuration information that can be daunting to frequent travelers and can consume considerable time and effort even by those having considerable networking skills.

Other factors that must be dealt with in establishing connections from home, field office, hotel, and other mobile locations (such as wireless links from the field) relate to network address information to be employed for network, including Internet, access. An IP (Internet protocol) address represents a communications end point, but some network nodes, such as shared computer facilities at a company location may have many users per address or many addresses per user. A typical network node will be identified by a unique 32-bit IP address of the form 101.100.2.2. A router that directs information to various end hosts has an IP address such as "101.100.2.1", where the last part will be a unique number identifying end hosts connected to the router. For example, for three hosts connected to such a router, these hosts may have IP addresses of 101.100.2.2, 101.100.2.3, and 101.100.2.4.

While occasional users may only require a temporary or dynamic address for each session, or transaction, with the same address being assigned to another user after the session or transaction is complete, many network nodes, such as those associated with a corporate host or network service provider require one or more permanent or static IP addresses. With a static IP address, authorized persons may direct traffic to or access information available at the static IP address at any time.

As will be readily perceived, there are many complexities and difficulties involved with connecting to and configuring a computer or LAN for communication through the Internet. Moreover, it will be appreciated that routers, including any at a customer location or at an ISP, must be configured correctly. At an ISP, a trained network operator is typically available for entering configuration information into a router, including the IP address of a customer, an account number, etc. Other configuration information that must be entered includes telephone numbers to dial, passwords, packet filter rules, LAN network information, domain name information, e-mail configuration, compression parameters and others.

Further, even when this is accomplished at an ISP, a customer must be made aware of this information, to permit manual entry of corresponding required information into networking equipment at a user location, e.g., to configure a router. For any but the simplest of connections, this process can prove tedious and error-prone. Further, a mobile user will be required to reconfigure his or her terminal or LAN for each new location, or access facility. It will be appreciated that connecting a LAN can be considerably more difficult than connecting a single computer node (host or client), as networked components may require specification of a variety of specific configuration parameters. Thus, parameters for network components, e.g, routers, firewalls, DNS servers and DHCP servers, and security mechanisms, must all be set correctly before the LAN can successfully communicate with the Internet.

As noted above, secure links present additional configuration and setup requirements, including, in appropriate cases, key exchange material and other tunnel configuration information. In prior work reported by some present inventors, a network adaptor and configuration procedure was employed that facilitates establishment of secure VPN tunnels, illustratively using an IPsec protocol, for a range of applications and uses. See, J. S. Denker, et al., "Moat: a Virtual Private Network Appliance and Services Platform," *Proc. 1999 LISA XIII*—Nov. 7-12, 1999, Seattle.

From the foregoing it will be appreciated that automation of the configuration and setup of network nodes, including IP LAN network nodes, seeking to securely communicate over IP networks, such as the Internet, is highly desirable. Such automated configuration and setup of computers and other network elements is especially desirable for mobile users. It is likewise desired that a flexible access system and configuration process be provided for configuring a computer system for communication over IP networks.

SUMMARY OF THE INVENTION

Limitations of the prior art are overcome and a technical advance is made in accordance with the present invention, illustrative embodiments of which are described below.

In accordance with aspects of one illustrative embodiment, a network interface unit is provided for use intermediate a LAN and a public or private network, or a combination of both, for establishing secure links to other nodes in a VPN. Upon connection and login with the network interface unit, addressing, authentication, and other configuration operations are applied in establishing tunnels to desired VPN destinations.

An illustrative network interface unit includes a Dynamic Host Configuration Protocol (DHCP) server, illustratively accessible using a web browser running on a client machine seeking access to VPN nodes. Encryption and encapsulation of data packets for communication with remote nodes or selected other nodes on a LAN to which the subject client machine is connected (collectively, tunnel end points) provides the required secure data transfer.

Configuration of a client machine for use with illustrative embodiments of the present inventive network interface unit is rapidly achieved by logging on to the network interface unit, e.g., employing a web browser, and specifying the nature of the connection desired, including, as needed, the nature of the access link (e.g., cable, dial-up, etc.), identification of a desired ISP and destination. Information stored on the network interface unit is then used to perform necessary login and other data access procedures over links to an ISP and through public and/or private network links to a desired VPN gateway or other access point, including required authentication exchanges, and any required encryption key exchanges.

Advantageously, illustrative embodiments of the present inventive network interface unit present a uniform graphical user interface (GUI) for pre-specifying desired types of connections, ISP information and target VPNs. Moreover, using other aspects of the GUI, a user's client machine is quickly and efficiently configured to establish the desired secure tunnel to the target VPN, with the user experiencing a uniform interface for a variety of access circumstances.

It proves advantageous in some illustrative embodiments to employ readily available components and streamlined storage and processing to effect the configuring and establishment of secure links. In some embodiments, some or all inventive network interface unit functions will be incorporated in a client machine (e.g., personal computer), or in a dial-up, cable, DSL or other modem, or in a LAN hub, switch, router or other network element connecting client machines to an ISP or otherwise connecting a client machine (directly or indirectly) to one or more public network links.

Aspects of the present inventive network interface unit and its use include methods for entering use and configuration information into an interface unit database, as well as extraction and application of configuration information to client machines and subsequent secure connection to desired VPNs.

BRIEF DESCRIPTION OF THE DRAWING

The above-summarized invention will be more fully understood upon consideration of the following detailed description and the attached drawing wherein:

FIG. 5 shows illustrative content of a database or table structure for memory elements shown in the network interface unit of FIG. 4.

FIG. 9 is a web page presented by a GUI server running at a network interface unit to a user when a specified standard dial-up connection link is to be edited.

FIG. 14 is a screen presented when a new connection is requested at main menu screen.

FIG. 15 is a web page presented by a GUI server running at a network interface unit to a user when the user wishes to edit a dial-up connection previously specified.

FIG. 16 is a web page presented by a GUI server running at a network interface unit to a user when the user wishes to edit a specified DHCP connection.

DETAILED DESCRIPTION

The following detailed description and accompanying drawing figures depict illustrative embodiments of the present invention. Those skilled in the art will discern alternative system and method embodiments within the spirit of the present invention, and within the scope of the attached claims, from consideration of the present inventive teachings.

Figure 1:
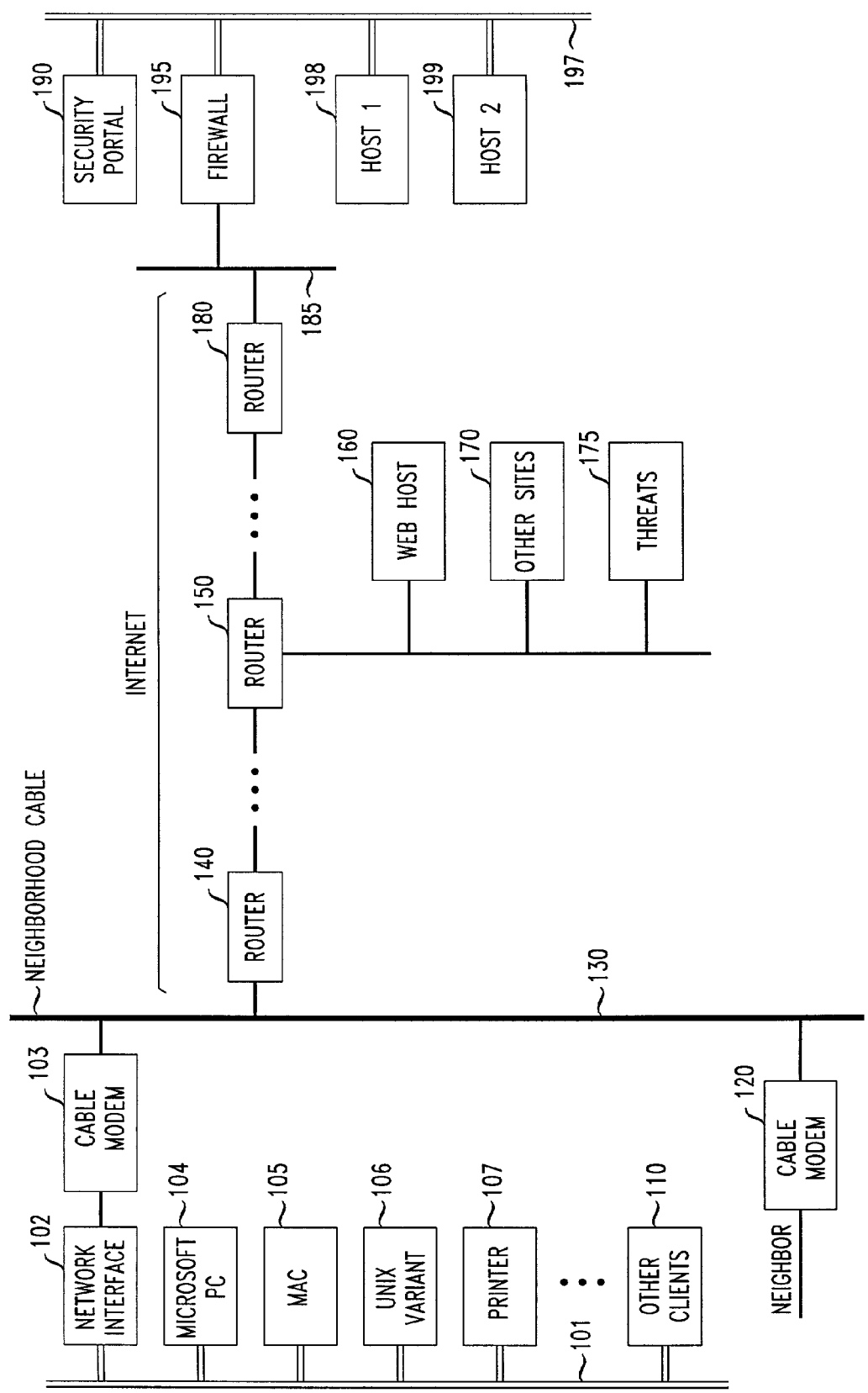
FIG. 1 shows an illustrative prior art network arrangement for establishing a link between an illustrative home office LAN and a corporate network.

FIG. 1 shows an overall view of an illustrative LAN (e.g., home-office or telecommuter LAN) 101 as physically connected through the Internet to a corporate headquarters (or main, or other substantial secured network LAN node), 197. LAN 197 is shown having a firewall 195 for receiving and appropriately filtering packets in accordance with a predetermined security plan. Security Portal 190 provides encryption and decryption services for received authorized packets, as well as encapsulation and de-encapsulation of received packets, as is well known in the art. Hosts 1 and 2 provide illustrative sources and sinks for information passing through firewall 195.

Illustrative user LAN 101 is shown having an illustrative assortment of user client computers and other facilities 104-107 and 110. Microsoft PC 104 represents a typical personal computer client running applications under one of the Microsoft Windows versions, while MAC 105 represents an illustrative Apple computer client running applications under Apple's proprietary operating system. Block 106 represents yet another client computer, this one running one of the many variants of the UNIX operating system, e.g., Linux, and applications compatible with that environment. Peripherals, such as printer 107 and other clients are also shown connected to LAN 101, as is well known in the art.

LAN 101 and illustrative clients connected thereto are shown connected through network interface unit 102 and, for the illustrative case of case of CATV (cable) access to the Internet, a cable modem 103. (For illustrative context, another cable modem 120 serving a neighbor of the user at LAN 101 is included in FIG. 1 as being connected on neighborhood cable 130 along with user's cable modem 103.) Finally, representative Internet routers 140, 150 and 180 are shown providing links through the Internet, though other network elements (not shown) may be included in the path from LAN 101 to LAN 197.

By way of illustration a path from router 150 is shown to a World Wide Web host 160, while block 170 represents illustrative ones of the many available Internet sites that may be accessible through (generally unprotected) links from LAN 101. Finally, as representative of the many security threats to communications over the Internet and other public networks, FIG. 1 shows a block 175 labeled threats. The latter category of public network perils includes, by way of example, monitoring nodes and agents seeking to extract information passing between users without authorization by such communicating users, as well as unauthorized access to nodes, such as LAN 101. Inventive structure and operational features of network interface units 102 acting in cooperation with other elements of the illustrative LAN-to-LAN network provide apparatus and methods for foiling attempts by threats represented by block 175. Such structures and operational features and methods will be described more fully in the sequel.

Figure 2:
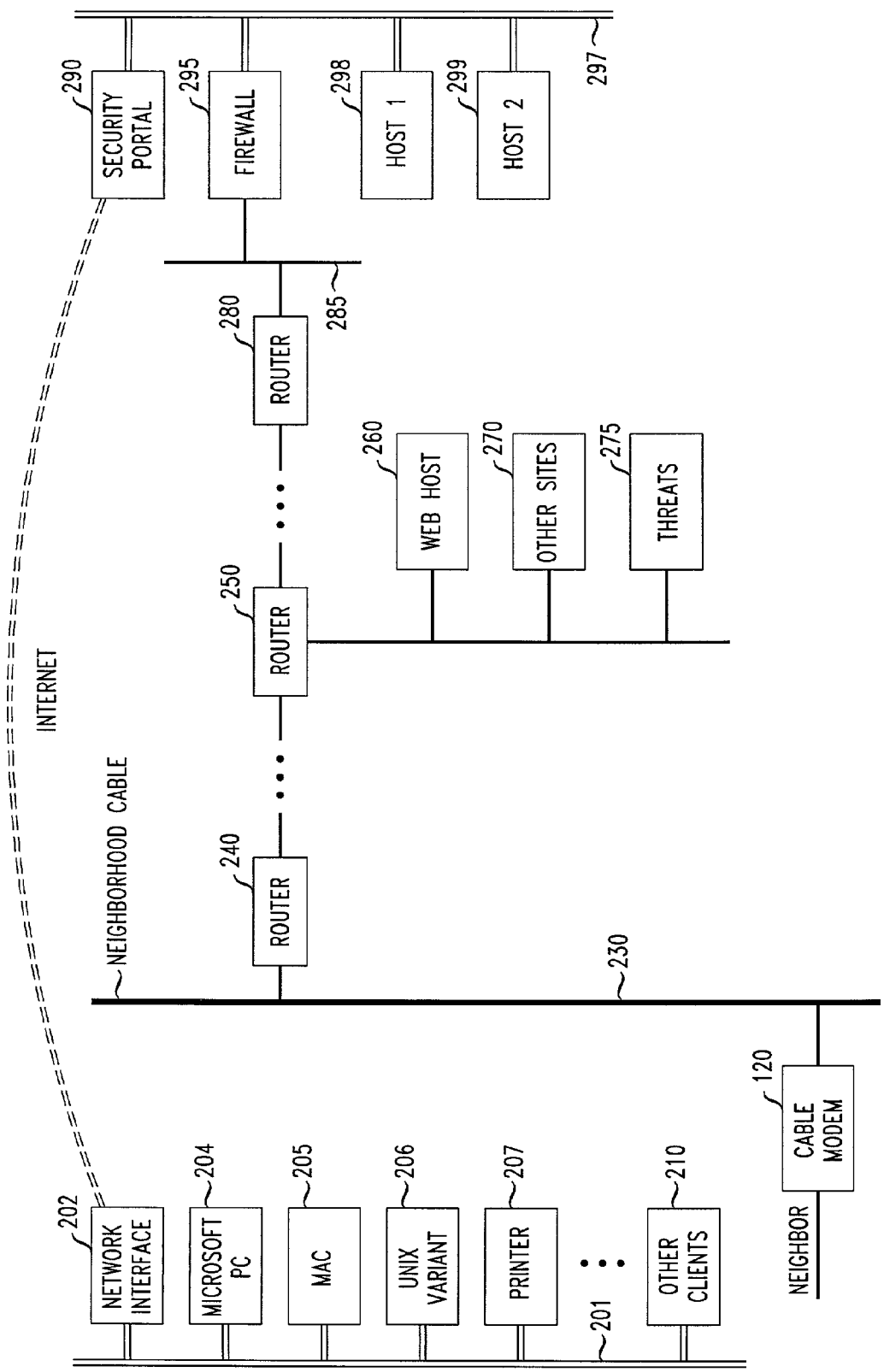
FIG. 2 shows an illustrative network arrangement for establishing a secure link between the illustrative home office LAN and corporate network of FIG. 1 using prior VPN arrangements.

FIG. 2 shows network interface unit 202 logically connected through a tunnel 215 in the Internet to security portal 290 corresponding to portal 190 in FIG. 1. Thus, in accordance with another aspect of the present invention firewall, encryption/decryption, encapsulation/de-encapsulation and other well-known VPN functions are performed through cooperation of interface network unit 202 and security portal 290. Further, inventive structures and functions of network interface unit 202 provide additional, enhanced services and processes to serve clients at LAN 201 and other user locations, whether served by a fixed or temporary network address.

Figure 3:
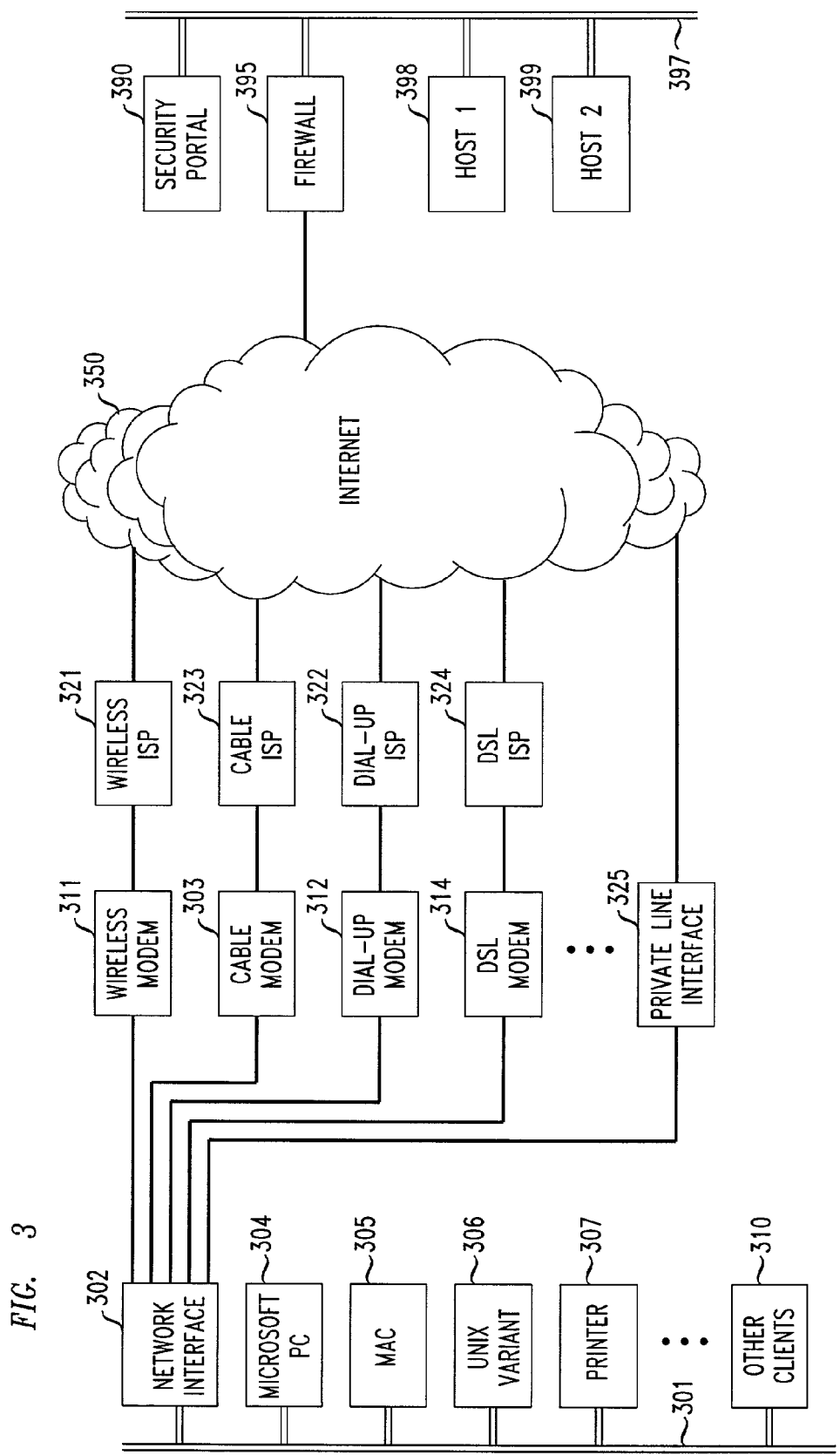
FIG. 3 shows illustrative extensions to the network of FIG. 2 in accordance with aspects of the present invention wherein a variety of access modes are served from a common network interface.

FIG. 3 shows an elaboration of links from user LAN 301 to LAN 397 interconnecting hosts 398 and 399 through firewall 395 using the services of security portal 390. In particular, access to the Internet through illustrative neighborhood cable 130 (and 230 in FIG. 2) is elaborated to show a number and variety of access links and methods, including (as before) cable modem 303 connected to the Internet via cable ISP 323. However, the links from LAN 301 to Internet 350 in FIG. 3 by way of network interface unit 302 are now shown to include wireless modem 311 (via wireless ISP 321), dial-up modem 312 (via dial-up ISP 322), DSL modem 314 (via DSL ISP 324) and private line interface 315 (via private line 325). As will be appreciated, each of these modems, interfaces, ISPs and (private) lines, and services provided through them, are characterized by certain addressing and operating parameters that require configuration to coordinate with operations of the ISPs, backbone Internet operations and destination node characteristics (e.g., those of LAN 397).

Network interface unit 302 is advantageously adapted to provide necessary configuration and operating control of secure links from illustrative LAN 301 and user-selected destination nodes, such as LAN 397. Of course, LAN 301 may not include all of the client operations shown in FIG. 3, or more than one LAN may be connected through network interface unit 302 to appropriately configure and control the secure operation of whatever clients require VPN services over the Internet (350) or other IP-based network including public-network links.

Figure 4:
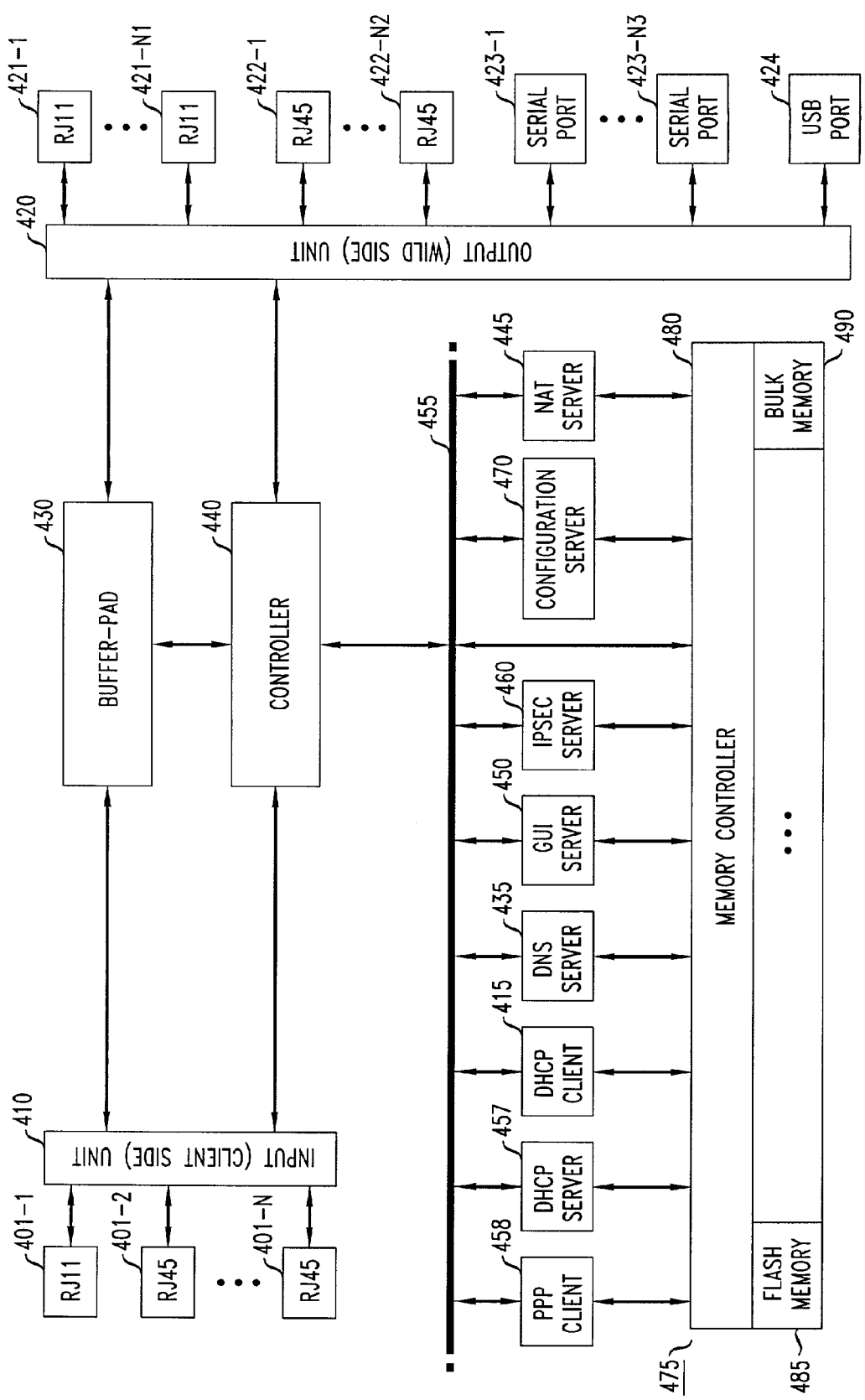
FIG. 4 shows more detailed aspects of the organization of the network interface unit of FIG. 3.

FIG. 4 shows in more detail functions advantageously available at network interface unit 302, which network interface unit and operation thereof will now be described in greater detail.

In overall organization, the network interface unit shown in FIG. 4 includes a plurality of input ports 401-$i$, $i=1, 2, \ldots, N$ transmitting and receiving data to/from respective client devices, such as those shown in FIGS. 1-3, having illustrative standard RJ-11 or RJ-45 connectors. Other particular connectors will be used as appropriate to user needs. Correspondingly, ports 421-$j$, $j=1, \ldots, N1$, 422-$k$, $k=1, 2, \ldots, N2$, and 423-$l$, $l=1, 2, \ldots, N3$, with each grouping of ports illustratively representing RJ-11, RJ-45, and one or another variety of personal computer serial ports, respectively. One representative additional port, USB port 424 is also shown in FIG. 4. Other particular connection arrangements and formats will be used as requirements may dictate.

Input unit 410 in FIG. 4 multiplexes/demultiplexes (performs mux/demux operations on) data passing from/to client devices connected through ports 401-$i$, to output unit 420, which provides similar multiplexing/demultiplexing functions with respect to data passing through ports 421-$j$, 422-$k$, and 423-$l$ and USB port 424. (Input unit 410 and output unit 420 are arbitrarily referred to as input or output units, though both units are bi-directional data handlers. It sometimes proves convenient to identify input unit 410 and its associated ports as client-side unit and ports, while referring to output unit 420 and its associated ports as wild-side unit and ports).

In addition to standard buffering operations to accommodate different or varying data rates, buffer-PAD unit 430 in FIG. 4 performs encapsulation and de-encapsulation (decapsulation) of IP packets passing in each direction through IPsec tunnels in accordance with IETF RFC 2406. Also, buffer-PAD 430 performs NAT transformations in cooperation with NAT server 445, including transformations on packets that are not routed through a tunnel for policy reasons. See, for example, IETF RFC 1631. Packets in either direction are susceptible of being dropped if they violate firewall rules.

Controller 440 in FIG. 4 operates under program control, including, illustratively, the well-known Linux operating system and a variety of control programs (all stored in memory unit 475) advantageously used in realizing, organizing and controlling operation of the several functional units of the network interface unit of FIG. 4. These functional units interact with users at client devices (through ports 401-$i$) primarily during client setup and configuration, illustratively using imbedded GUI server 450. More particularly, as will be described below in connection with FIGs. A-J, users logging-in to establish connections over a VPN are presented with standard web page formats on client machines with which connection and destination information is readily specified or selected using web browser functionality on client computers. These web pages are provided by GUI server 450 running at the network interface unit of FIG. 4, which GUI server is of a well-known design in widespread use for a range of web server applications. Once configured, client computers (and other client devices) send and receive packets under the overall control of controller 440 acting in cooperation with the various (preferably software-implemented) functional units to be described further below.

In one aspect, controller 440 interacts with configuration server 470 to receive and store configuration information. Such configuration information is advantageously maintained and updated in memory 475, and retrieved during configuration setup operations through memory controller 480 under the overall control of controller 440. Memory 475 is advantageously organized into one or more separate memory elements. Flash memory 485 and bulk memory 490 are shown by way of illustration in FIG. 4, but any convenient, appropriately sized memory device may be used—as will be recognized by those skilled in the art. Because of the modest memory requirements of many implementations of the network interface unit of FIG. 4, it will advantageous to rely primarily on removable memory devices, such as flash memory unit 485 shown in FIG. 4.

Other functional elements served by memory 475 that operate under the overall direction of controller 440 include GUI server 450 for providing web pages to users at client terminals 401-*i* having appropriate browser software and display functions (such as those available in personal computers, handheld computers, or cell-phones capable of running web browsers or mini-browsers). When employing standard personal computer web browsers, such as those available from Netscape or Microsoft, client machines merely interact, e.g., entering or selecting data associated with predefined web page fields, as is well known in the art. Examples of such interactions will be presented below.

When particular client devices on LAN 301 in FIG. 3 are not capable of running a suitable GUI client application (such as a web browser) for interacting with GUI server 450, it proves advantageous to have another device, such as a personal computer that is capable of executing a compatible GUI client application may act on behalf of the client device not having such GUI client application. While web browsers are described as suitable for interaction with GUI server 450, other particular GUI servers and compatible clients will be used in particular contexts and applications of present inventive principles. In one preferred embodiment of the present invention, a single GUI-client-enabled client device on LAN 301 will login and authenticate with network interface unit 302 on behalf of all devices on the LAN for purposes of establishing appropriate tunnels to other locations on one or more VPNs. Thus, once access to network interface unit 302 is granted for a device (such as a personal computer) on a client LAN, such as 301 in FIG. 3, all devices on that LAN are advantageously configured.

By way of illustration of the use of cell phone-based mini-browser interaction with GUI server 415, an Ericsson model R280LX cell phone (with add-on data port, including a wireless modem, represented FIG. 3 by wireless mode 311) will illustratively employ one of several micro-browser cards to display and receive information useful in specifying and selecting communications access and destination information while connected to the network interface unit of FIG. 4. User text input (and user-defined soft keys available as a feature of the illustrative Ericsson cell phone) will likewise be used to direct setup and operation of secure data communications from a data source connected through a cell-phone data port. In other client machines graphical styli, touch-sensitive screens and other user inputs will be used, as appropriate to particular circumstances.

Other control functionality and browser/GUI-server interaction in executing particular user-level applications will be readily implemented using any of a variety of scripts and applets, e.g., coded in the well-known Java language and running at cell phones (and other wireless clients) in coordination with GUI server 450. A variety of application tools are available, e.g., those from Sun Microsystems in support of JAVA applications generally, and, more particularly, for wireless applications using Sun's Java 2 Micro Edition (J2ME). Further application development support is available from companies such as Lutris Technologies, which offers its Enhydra XML- and Java-based server (including Lutris' i-mode microbrowser) and other tools in support of wireless applications. Lutris also offers tools promoting use of J2ME to create applications for Motorola iDEN and other handsets. See, for example, http://wWw.lutris.com.

IPsec server 460 cooperates with controller 440 to apply desired encryption/decryption and encapsulation/de-encapsulation operations required by user or VPN system controls. Appropriate communications parameter values are provided to IPsec server 460 for communications between particular user clients and particular network (ISP, destination host, and other) elements during configuration setup. Encryption keys and other key exchange material is likewise provided as part of configuration setup. While various implementations of IPsec (IP security) software are available, one software implementation appropriate for the Linux environment is the so-called FreeS/WAN implementation available for download at http://www.freeswan.org/intro.html. While this package advantageously runs under the Linux operating system illustratively employed by the network interface unit of FIG. 4, other IPsec implementations are available for use in a variety of contexts and environments.

IPsec uses strong cryptography to provide both authentication and encryption services. Authentication ensures that packets are from the right sender and have not been altered in transit, while encryption prevents unauthorized reading of packet contents. These services provided by IPsec support the desired secure tunnels through untrusted (non-secure) networks, thereby forming the desired VPN link. As note above, all data passing through the untrusted net is encrypted by one IPsec-enabled network node and decrypted by another IPsec-enabled node at the other end of the link. In the examples of FIGS. 3 and 4, the illustrative network interface unit of FIG. 4 (302 in FIG. 3) provides IPsec processing, while complementary IPsec processing is performed at security portal 390 in FIG. 3.

NAT server 445 shown in FIG. 4 cooperates with controller 440 to optionally provide network address translation to packets received on client-side input unit 410 for the case of packets being sent to parts of the Internet not included in a private LAN such as LAN 397 in FIG. 3. Such packets are effectively masqueraded as coming from an address belonging to wild-side output unit 420, a technique known as split-tunneling that is well known in the art. NAT server 445 also applies inverse operations to augment packets received from unit 420 to permit reception by the proper client device, all as is well known in IP networking. Use of NAT server 445 is advantageously a configuration option; a system administrator may elect instead to have a private LAN, such as 397 in FIG. 3, handle outside traffic, e.g., through firewall 395.

DNS server 415 provides network address resolution for destinations specified in other formats, and substitutes for access to network-based DNS servers commonly used for non-secure networking applications. Thus, by constraining client access to only authorized destinations (as specified in the DNS server) a further measure of security is assured. Of course, the authorized destinations are those that have previously been authorized by respective VPN operators, as augmented by user specification within limits set by the network operators. While DNS server 415 stores address resolution information in tables or other convenient form in memory 475, it advantageously forwards requests for entries not stored locally to a trusted server on the VPN, thus providing security against so-called DNS spoofing.

Dynamic Host Configuration Protocol (DHCP) server 457 in FIG. 4 provides a temporary or dynamic host network address (in the context of FIGS. 3 and 4, a client network address in the sense of being an address for a client device, such as a personal computer on LAN 301 in FIG. 3). DHCP, defined in IETF RFC2131 and RFC2132, and widely described, e.g., in N. Alcott, *DHCP for Windows* 2000, O'Reilly, Sebastopol, Calif., 2001, permits reuse of IP addresses when a client no longer needs the address. DHCP server 457 in FIG. 4 accesses a database of available IP addresses and related configuration information (conveniently stored in memory 475) and responds to requests from a client on illustrative LAN 301 for a temporary network address. A pool of network addresses is advantageously assigned to a VPN, and an authorized subset of such assigned addresses is pre-stored in memory 475 for use by a particular network adapter in the absence of any external network connection. Thus, a network adapter of the form shown in FIG. 4 need not resort to an external DHCP server to commence operation.

Having DNS and DHCP servers 435 and 457 operate without recourse to hosts such as 398 and 399 (at the destination end of an IPsec tunnel) in FIG. 3 in providing respective destination and client addresses permits local or otherwise limited network operation, even when WAN links to other network resources are not available.

PPP client 458 provides connection facilities similar to those provided by DHCP client 415, but does so for point-to-point protocol connections. That is, IP addresses are allocated on an as-needed basis and are commonly applied to short-term connections, such as dial-up access to ISPs, and to some more permanent connections—such as ADSL connections.

FIG. 5 provides a partial map of illustrative contents of memory 475 for the network adapter unit of FIG. 4. In many applications, especially those where size of the network interface unit is important, it proves convenient to employ flash memory elements 485 (or other detachable memory elements) for all of the memory needs of the network interface unit. In any event, FIG. 5 shows, in a first memory portion, data components specifying device type and identification information for client devices, e.g., personal computers, etc. Such information will describe relevant aspects of the client device including, as appropriate, network interface card (NIC) information for the client devices. It proves convenient to also include, as needed, translated address information assigned to devices by NAT server 445 in this portion of memory 475.

A second portion of the memory map of FIG. 5 provides IP configuration information for each of the client devices, including assigned (permanent or temporary) IP addresses. Login, password, telephone number and other information needed for dial-up connections is also included in memory 475 as shown by the corresponding memory map entry in FIG. 5. Encryption keys, other key materials, as well as authentication and other security information employed in operation of IPsec server 460 is conveniently stored in the portion of memory map labeled tunnel id.

GUI server web pages for display (via a web browsers executing at client computers) and data input by users at clients are stored in yet another portion of memory 475, as further reflected in the memory map of FIG. 5. GUI information, including any needed display element characteristics for each enrolled device type is provided in the portion of memory 475 mapped as GUI info in FIG. 5. Also shown in the memory map of FIG. 5 is a portion labeled DNS information representing information used by DNS server 435 in effecting needed address translations. DHCP address information available for use by clients is stored in another illustrative memory portion shown in FIG. 5, as is PPP information.

Illustrative Operation

Figure 6:
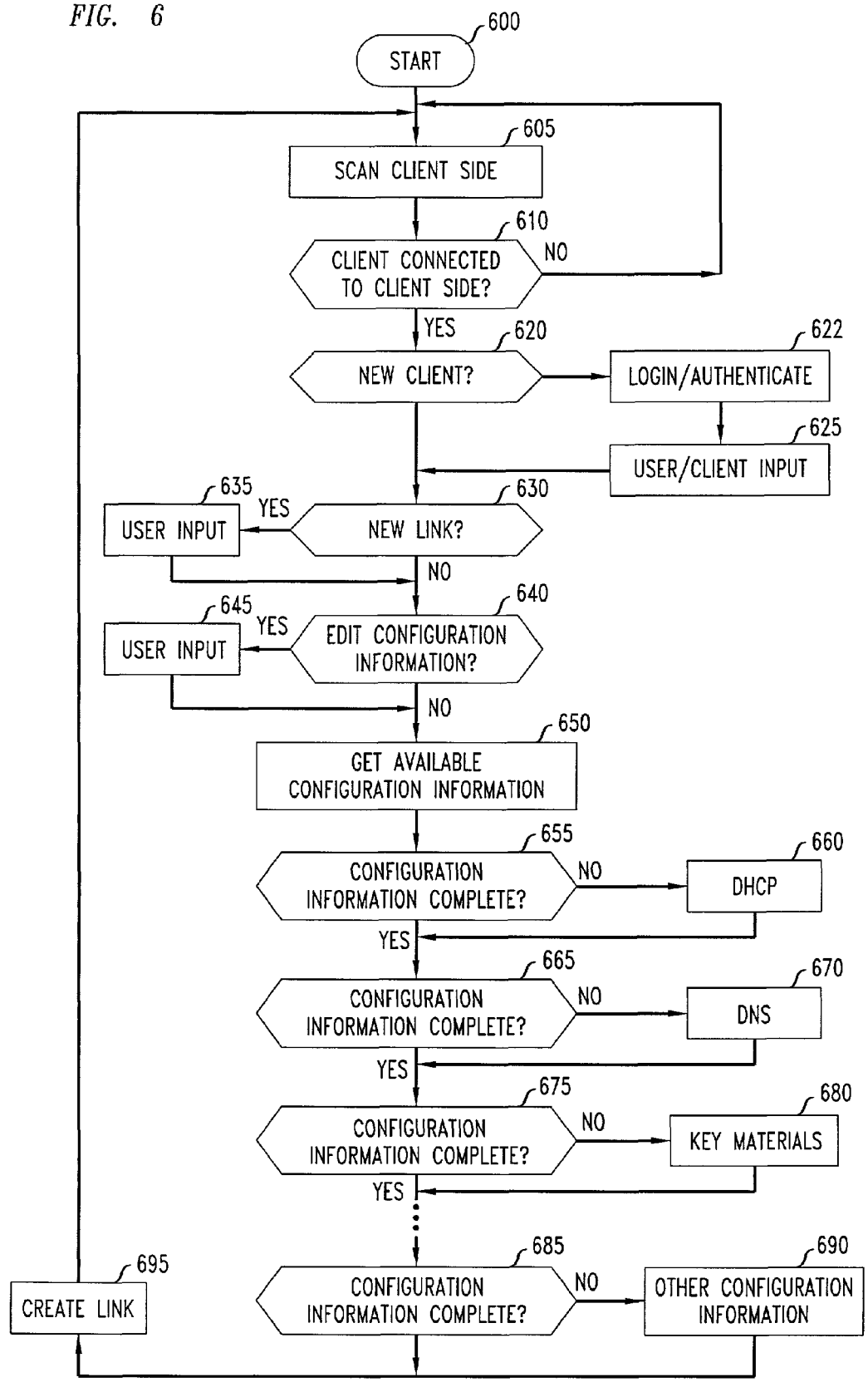
FIG. 6 is a flowchart showing illustrative client configuration and link establishment employing the network interface unit of FIG. 4.

FIG. 6 is a flowchart showing illustrative operations and method steps in performing configuration and connection of client devices, such as those shown by way of illustration in FIG. 3. FIGS. 7-16 show illustrative web pages provided by GUI server 450 for use in setup and configuration of network clients in accordance with illustrative embodiments of the present invention.

In FIG. 6, starting at 600, a scan is made (repetitively) to test for the presence of clients on client-side inputs 401-*i*; a test for client activity is then made at 610. If no client is actively connected to a client-side input, or if a previously active client becomes inactive (is effectively not present), all active links (or, when a previously active client becomes inactive, the previously active link) are taken down, as represented by 615 in FIG. 6.

If a client is found to be present at a client-side input by the test at 610, a test is made at 620 to determine whether the client is a new client. (In the following discussion, other on-going links will be ignored to simplify description of steps for a newly arrived client.) When a new client (or newly arrived or returned client) is detected at 620, a login/authentication process is performed by which a user at a client is determined to be a person authorized to gain access to a VPN using an embodiment of the present invention. As noted above, some embodiments of the present invention provide that a single authorization for access will grant access to all client devices on the LAN, so a presence on the LAN will give rise to configuration and access to VPN facilities.

Figure 7:
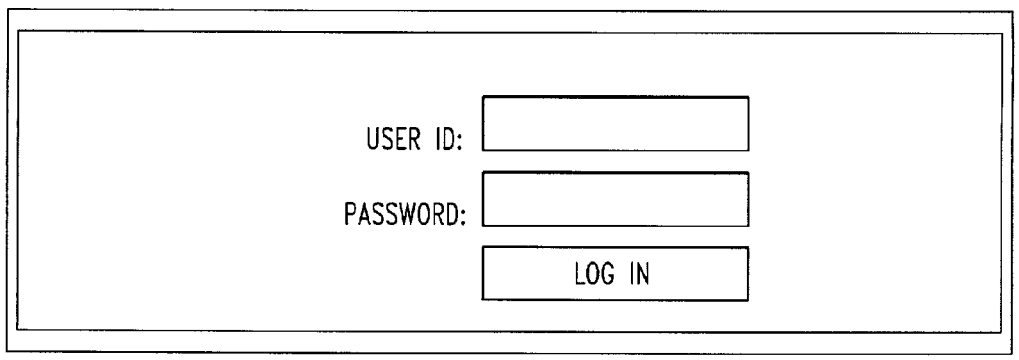
FIG. 7 shows an illustrative login web page presented at a user computer using a web browser for accessing a network interface unit running a GUI server, this at a time when the user is seeking to establish a secure link to a VPN.

Specifically, a user is presented with a login web page such as that shown in FIG. 7 (or, in some embodiments, with an alternative text or graphical login screen presentation). Previously agreed on User ID and password information will be authenticated after selection of the log in button at a client presenting a web screen such as that in FIG. 7.

Figure 8:
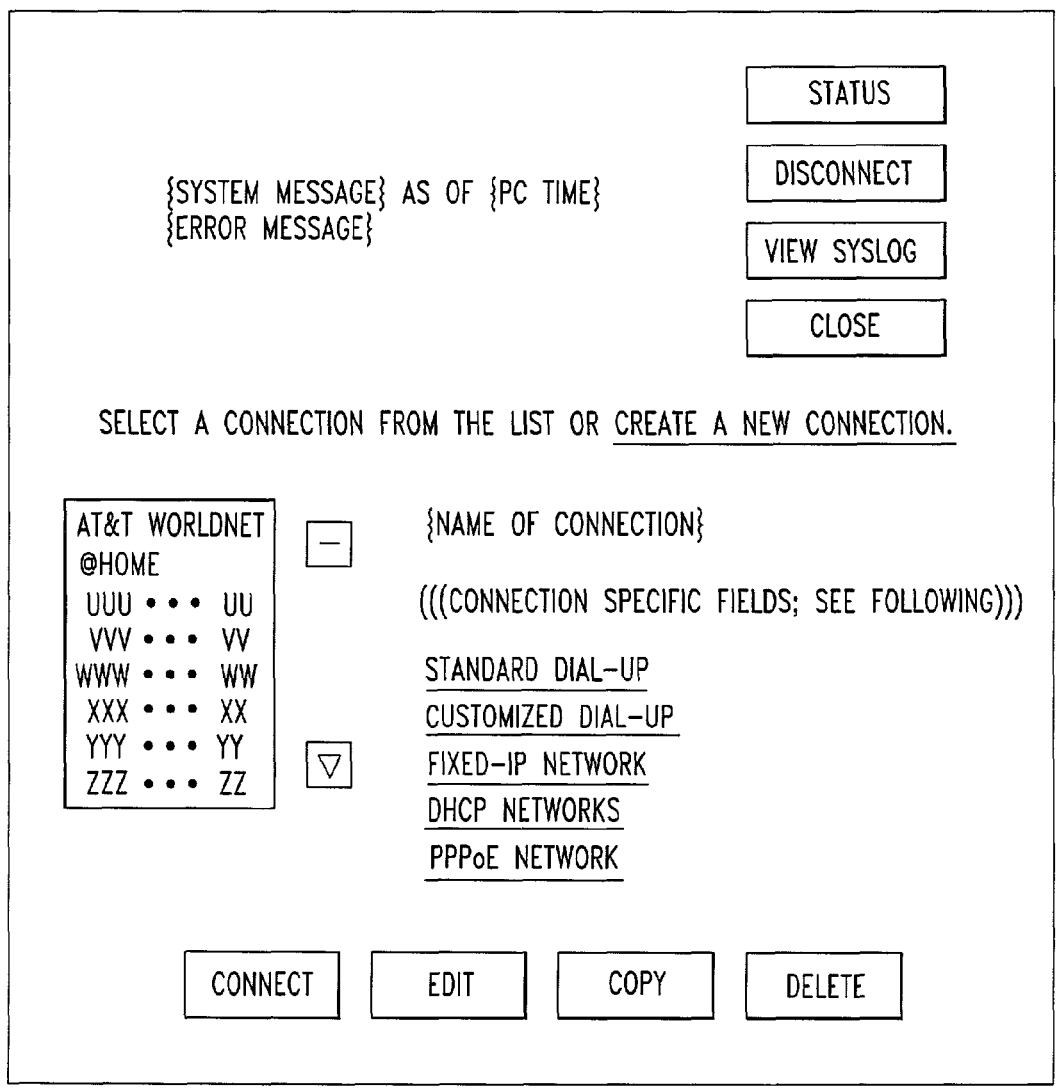
FIG. 8 is a web page presented by a GUI server running at a network interface unit to a user after login to the network interface unit when a connection is to be specified.

Successful login using the web page of FIG. 7 advantageously causes the presentation of a main menu web page, illustratively of the form of the web page shown in FIG. 8. In FIG. 8, a menu including a list of available ISP (or other destination) selections is presented at the left, with scrolling available when the list exceeds the nominal list window size. Such menu entries will include ISPs to which users at clients on LAN 301 subscribe. Upon selection of a list entry, connection information associated with the selection conveniently appears to the right of the list window, in the area denominated NAME OF CONNECTION. Such connection information need not be a network address, but will be an appropriate logical specification of a connection sought to be made. In some cases, a name of an ISP will be appropriate to identify configuration information associated with the desired connection. Selecting the CONNECT screen button then effects the connection to the indicated ISP or other destination.

When a connection to a destination not specified in the menu of the main menu web page of FIG. 8 is desired, provision is made in the web page of FIG. 8 to select links to another web page associated with connections in any of the illustrative categories of connections shown in FIG. 8 below the NAME OF CONNECTION field on that page. Specifically, Standard Dial-Up, Customized Dial-Up, Fixed IP address Network, DHCP Network and PPPoE Network connections are shown as available. In other contexts or applications of the present inventive teachings, other particular types of connections will, of course, be available for selection. Selection of one of the illustrative connection-type links in FIG. 8 causes a follow-up web page to be sent to the selecting client from GUI server 450 in FIG. 4. These and other web pages will be discussed below in connection with FIGS. 9-16

Returning to FIG. 6, block 625 corresponds to selections made at the main menu page of FIG. A or other pages to be discussed below, as appropriate. The test at block 630 in FIG.

6 corresponds to the selection by a user of the create a new connection link from the main menu of FIG. A.

FIG. 9 is a web page provided by GUI server 450 when the STANDARD DIAL-UP link is selected at the web page of FIG. 8 (for the case that the desired connection is not listed in the menu at the left in FIG. 8). In FIG. 9, provision is made for a user at a client to enter a dial-up connection in the name of connection field, and to enter appropriate user id and password inputs to be used. Other information, such as phone number to dial, and options to add special characters (such as 9 for an outside line, or (*70 to disable call waiting) are likewise entered as needed. Of course, all information after the name of connection can be predicted in many cases by storing prior sessions associated with the connection name and retrieving appropriate parts of the prior session information to complete the form of FIG. 9. In any event, provision is made to edit presumed field information by selecting the edit button when incomplete or erroneous information is presently displayed. Editing screens will be described below.

Selection of the connect button in the screen of FIG. 9 will cause a connection to be attempted based on the entered or accepted information presented on that screen. Other choices that are offered to a user at a client on LAN 301 by the network interface unit 302, via its GUI server 450 include copying currently displayed information for use in another connection (perhaps after editing in the web page for such new connection) and deleting currently displayed connection information. Further, most screens presented by way of example in the present description include status, disconnect, view syslog and close buttons to select the respective well-known operations and displays.

Figure 10:
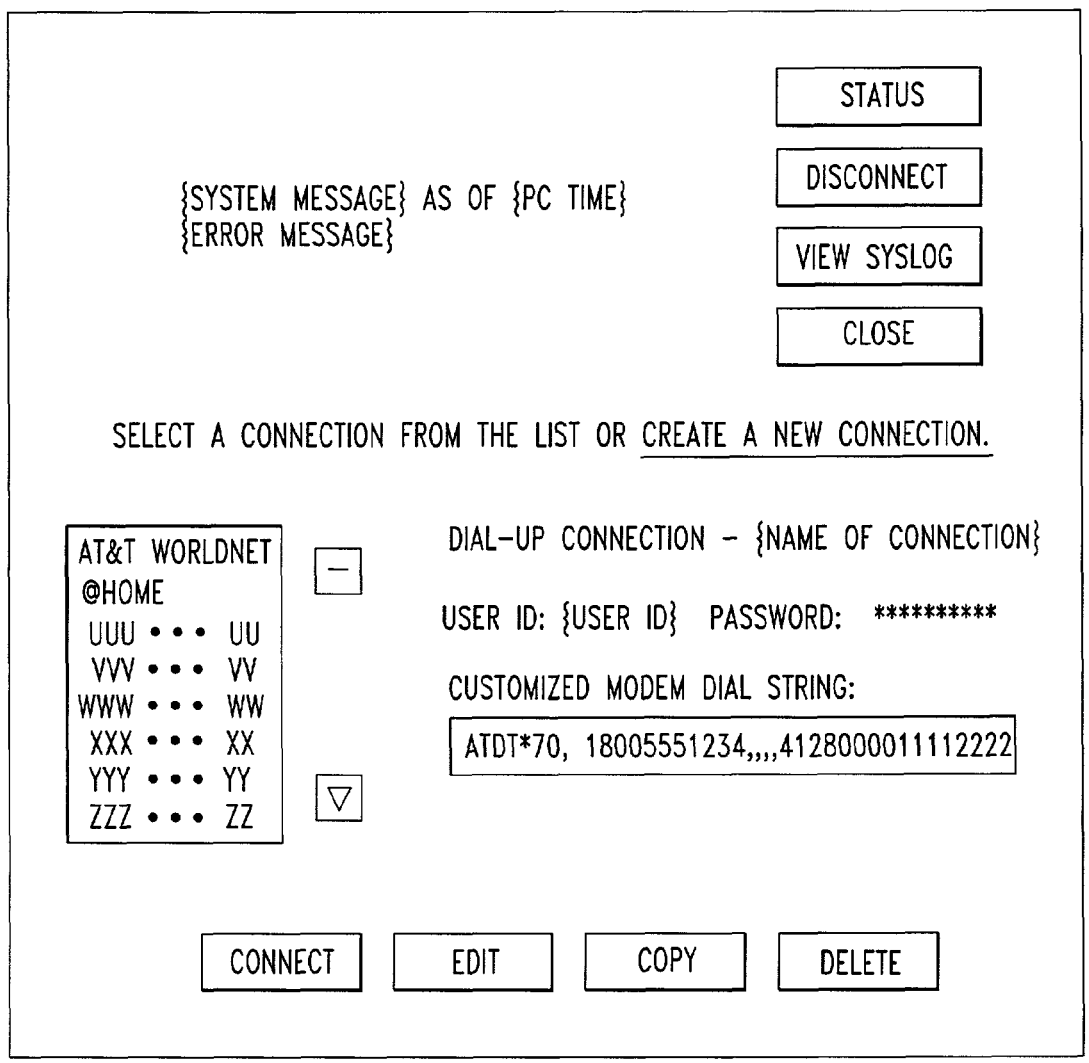
FIG. 10 is a web page presented by a GUI server running at a network interface unit to a user when a customized dial-up connection link is selected at the screen of FIG. 8.

FIG. 10 is a web page that is illustratively displayed upon selecting the CUSTOMIZED DIAL-UP link from the main menu of FIG. 8 when the menu at the left of FIG. 8 fails to display a desired connection. Thus, in FIG. 10, as in FIG. 9, a name of connection field is completed and the remaining fields filled in (either manually or by recognition of presumed information associated with the name of connection information) before selecting connect. Customized modem dial settings are employed when a more complex digit or character string is needed to appropriately control a dial-up modem session.

Figure 11:
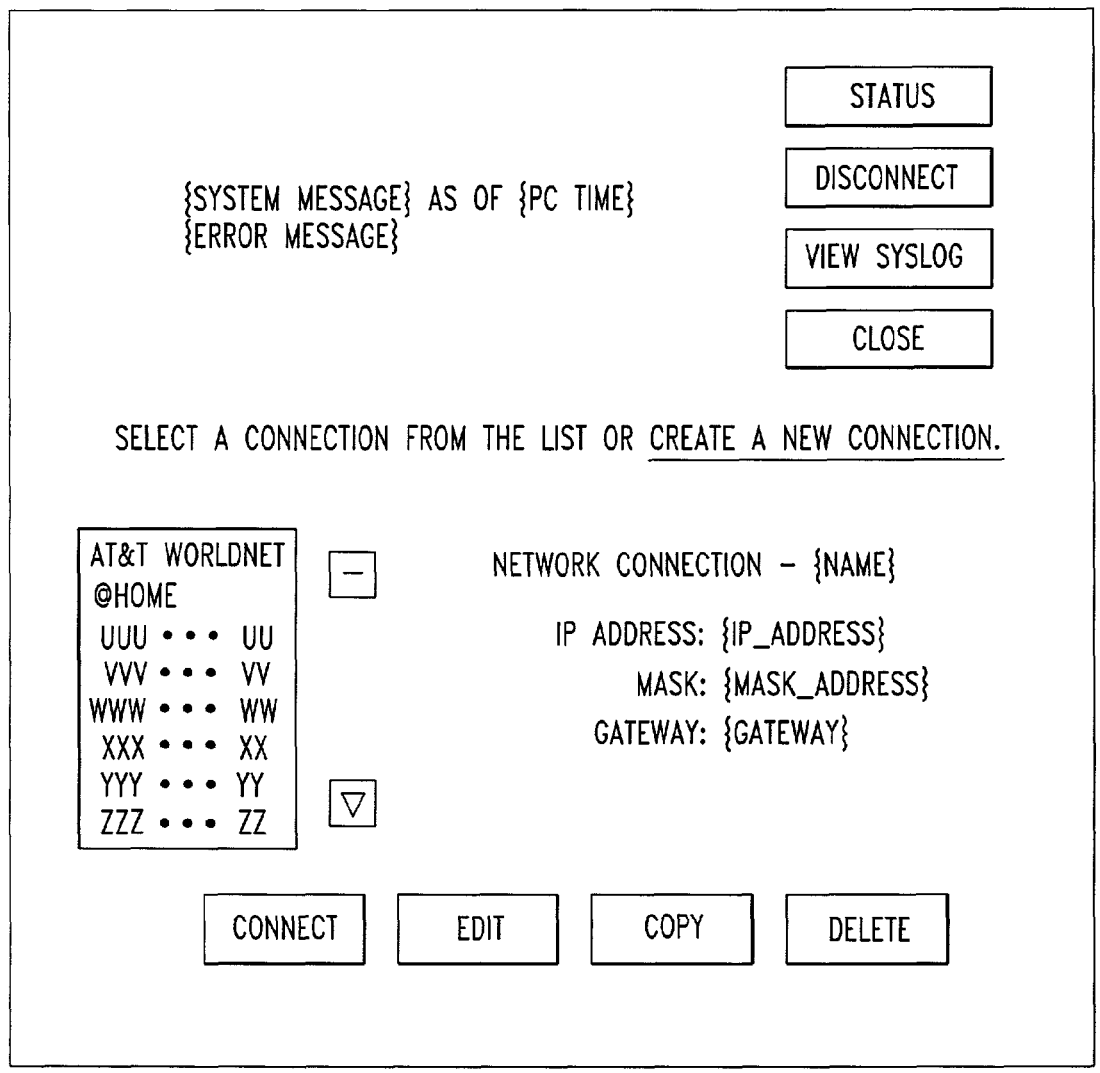
FIG. 11 shows a main menu page presented by a GUI server running at a network interface unit at a time when a network connection may be selected or newly specified.

FIG. 11 is a web page that is illustratively displayed upon selecting the FIXED-IP NETWORK link from the main menu of FIG. 8 when the menu at the left of FIG. 8 fails to display a desired connection having a fixed IP address. As with the web pages of FIGS. 9 and 10, a name of a network connection is filled in and the other indicated information (ip_address, mask_address, and gateway) retrieved from a prior session or filled in by at the client device on LAN 301. Selecting the connect button again initiates the connection to the indicated address.

Figure 12:
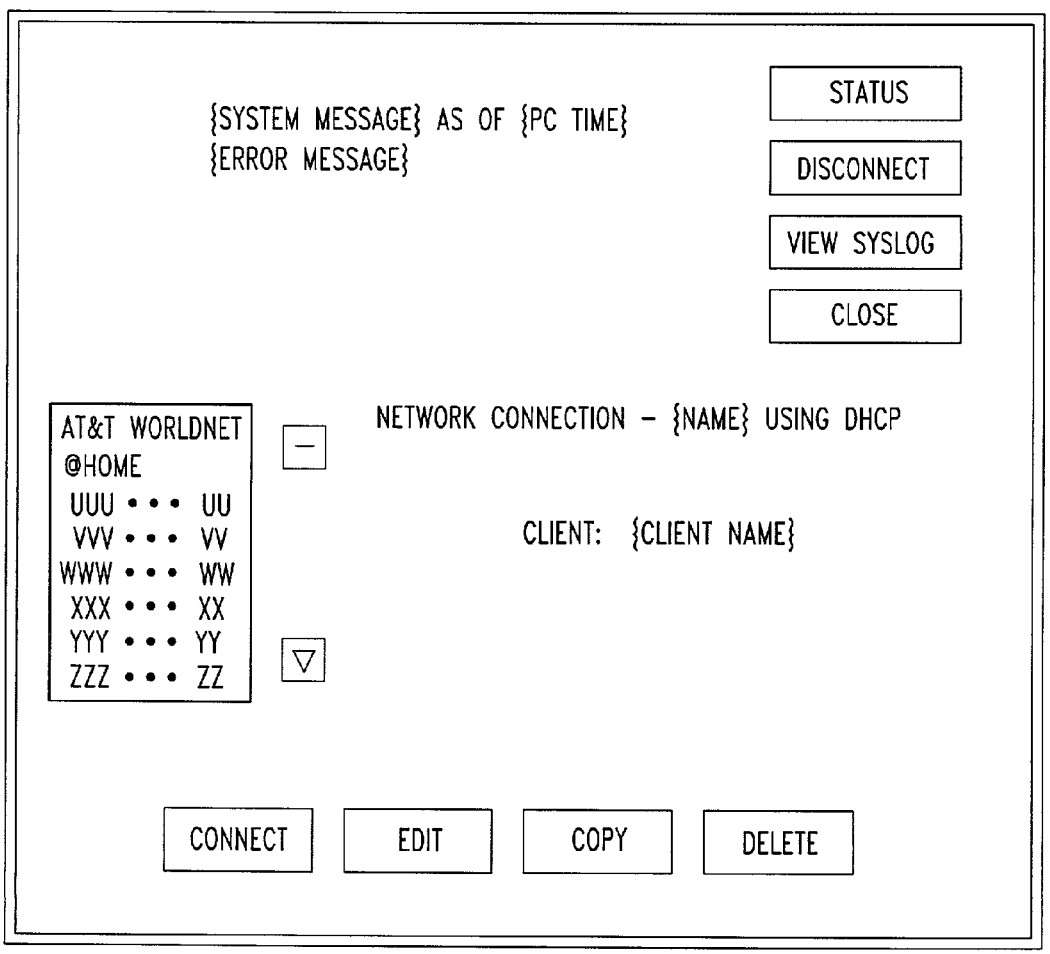
FIG. 12 shows a screen that is presented by GUI server 450 upon selection of the DHCP option at the main menu of FIG. 8

FIG. 12 is a web page that is illustratively displayed upon selecting the DHCP NETWORKS link from the main menu of FIG. 8 when the menu at the left of FIG. 8 fails to display a desired connection having a known temporary IP address. FIG. 12 shows a screen that is presented by GUI server 450 upon selection of the DHCP option at the main menu of FIG. 8. This screen allows the insertion of a string used to identify DHCP client 415 in the network interface unit of FIG. 4 to a network-based DHCP server when a network connection (such as a connection on a cable network) having a DHCP server to assign IP addresses. Thus, when a user inserts a network ID associated with the network interface unit in the Client: {Client Name} field and selects connect, the network-based DHCP server returns a packet (often called an offer packet) with at least one offered IP address. The network interface unit DHCP client 415 then accepts an address from the offer packet and notifies the network-based DHCP server of the selection so that the IP connection is fully defined. The IP address thus accepted is conveniently maintained at the network interface unit; this is a wild side IP address by which the network interface unit will be known on the Internet or other external network. In a complementary manner, IP addresses are assigned to network interface unit 302 (illustratively from a pool of reserved address) by a network administrator during a static setup of unit 302 will be used by DHCP server 457 to identify clients on the client side of network interface unit 302.

While not shown expressly in the attached drawing, PPPoE connections are configured and setup in substantially the same manner as dial-up connections (with login id and password, but without a dialstring). Further, while not noted specifically for the web pages of FIGS. 9-12, each of those web pages (as well as others associated with connection-type-specifying links that will be included on a web page such as that shown in FIG. 8) will advantageously have a menu of connections from which the name of the connection can be selected. That is, the menus of FIGS. 9-12 will in appropriate cases include available connections of the type (standard dial-up, etc.) associated with the respective web pages, rather than connections of all types as may be the case for the menu of FIG. 8.

Figure 13:
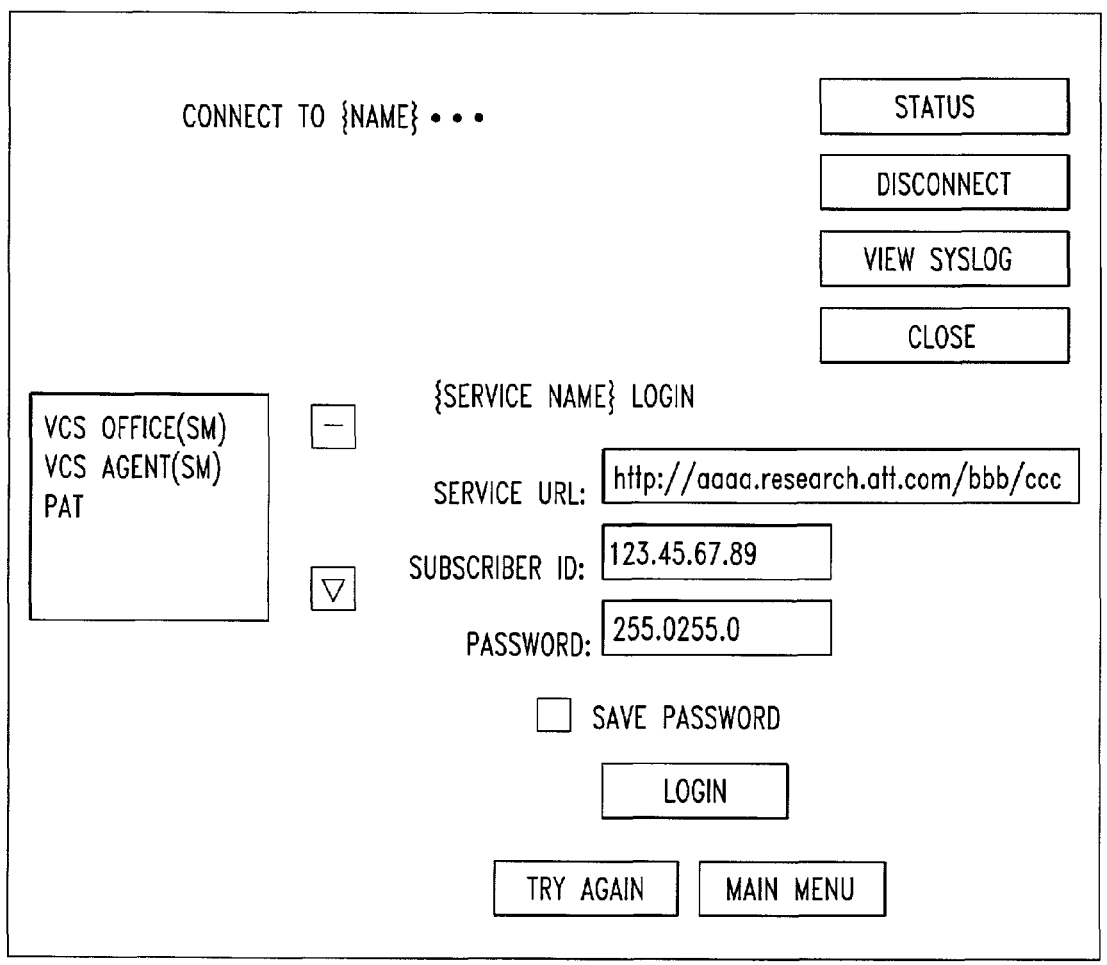
FIG. 13 is a web page presented by a GUT server running at a network interface unit to a user for selecting a desired network service.

FIG. 13 is a web page displayed after a connection has been established for selecting an identified service destination from among those illustratively appearing in the menu at the left of the web page. It proves convenient to display the URL of a selected destination, as well as account and password information, which will advantageously be stored in a memory such as 480 in FIG. 4 for use on future attempts to access the particular service. When the information is filled in the manner indicated, a connection to the application is then sought by selecting the login button on the screen of FIG. 13. Different particular connection profiles (for particular fixed-IP, dial-up, etc.) will, of course, display particular information fields appropriate to the service or application. Thus, mail service will have one set of displayed information fields, but other services (such as one of the illustrative VCS services shown in FIG. 13) will employ other particular fields.

When a desired link is not indicated in the list on the main menu of FIG. 8, or is known not to be available as a selection in one of the subordinate menus (such as the types shown in FIGS. 9-12) it proves advantageous to permit the specification of a new connection by selecting the hypertext link create a new connection in FIG. 8. In one illustrative context, selection of the create a new connection link gives rise to the display of a new connection form, illustratively having a layout shown in FIG. 14. User input specified in block 635 in FIG. 6 is conveniently accomplished using the form of FIG. 14. Specifically, in the form of FIG. 14, a name is assigned to the desired connection, and the connection type is selected, illustratively as one of two (or more) radio buttons such as the dial-up connection and network connection radio buttons shown in FIG. 14.

Additional information required in specifying a new connection will, of course, depend on the nature of the connection. The form of FIG. 14 provides for entry of information commonly associated a selected connection type (dial-up or network). When a dial-up connection has been selected at Step 2, login information (User ID and password) for the dial-up connection is conveniently specified, as is a further selection (by a respective one of the radio buttons) between a standard dial-up connection or a dial-up connection using a customized modem dialing string. When the latter alternative is selected, the appropriate dialing string is also entered in the indicated space. When a standard dial-up connection is selected, then the (PSTN or other) phone number is entered, along with additional optional information, such as an 8 or 9 typically used to select an outside line at a hotel or some office spaces, and a code to disable call waiting, if applicable. Selecting the Save button causes the entered configuration information to be entered in associated portion of memory 475.

FIG. 15 is an example of an edit page presented by GUI server 450 when an Edit button is selected in another (dial-up) screen. In that page, the configuration information for an identified dial-up connection is modified by entering additional or alternative information, and the new configuration can be used to replace an existing one or saved as a specified other connection. FIG. 16 provides an editing form for network connections similar in purpose to the edit form of FIG. 15 used for dial-up connections. User inputs using the web page forms of FIGS. 15 and 16 correspond to user input block 645 in FIG. 6 after a test for editing of a pre-existing configuration.

Again returning to FIG. 6, following all editing of configuration information using the operations at blocks 640 and 645, all available configuration information for a current link from a requesting client is retrieved at block 650 and tested for completeness at block 655 for the need for information derived by DHCP server 457; if such a need exists, access to DHCP server (as indicated by block 660) is effected. A similar test is made at block 665 for needed DNS information and recourse is had to DNS server 435 (block 670) as appropriate. Another test is illustratively made for the completeness of key materials and other IPsec information and, if any such configuration and operational information needed for IP services, recourse is had to IPsec server 460, as indicated by block 680, labeled simply get key materials. Other tests for completeness of configuration information will also be performed when needed, as indicated by the test at 685 (with the get other configuration information block 690) and the ellipsis between blocks 675 and 685.

Finally, when configuration information has been found to be complete, at block 685 the secure link (tunnel) is created and communications proceeds over the link until a termination of the session for any reason.

From the foregoing, it will be seen that illustrative embodiments of the present invention provide flexible access to VPN tunnels with reduced complexity relating to configuration of client devices and secure network links. As will be appreciated, substantially all of the required configuration information, as well as operating system and interface unit software functions is conveniently stored in network interface unit memory 475. Further, this memory may assume the form of a flash card or other readily removable memory device for additional network security.

The present invention has been described in the context of, and provides operational advantages for one or more LANs, each supporting a plurality of personal computers and other devices. Thus, for example, a traveling business person will efficiently and simply access a corporate headquarters LAN over the Internet by connecting through a network interface unit supporting a variety of client devices including one a laptop computer, web-enabled cell phone, personal digital assistant and a variety of peripheral devices. Such connections will be made from corporate branch offices, customer offices, supplier offices, hotel rooms and, via wireless links, from virtually anywhere. Such connections will be available over dial-up, cable, DSL, private line, wireless and other types of links, the configuration information for which will be automatically derived using present inventive teachings.

While illustrative embodiments of the present invention have been described in terms of a variety of servers, e.g., IPsec server, DHCP server, and the like, it will be understood that such servers represent functions advantageously performed in many cases by a processor operating under the control of stored programs and data in a network interface unit. In some embodiments it may prove useful to have a dedicated processor to one or a group of such servers or other functions, but in general controller 440 will be realized using a general purpose processor, which processor will be shared in carrying out the functions of the various servers, clients and other elements of illustrative network interface unit embodiments. It will prove convenient in many cases to have all required programs, including an operating system, such as the illustrative Linux operating system and the programs for performing functions of the described elements on a single removable memory unit, such as the above-mentioned flash memory card 485.

While the present invention has been described in terms of illustrative network interface unit embodiments having a separate physical identity from client devices, such as personal computers, some embodiments will assume the form of an add-on device, such as a peripheral card or pc card, or such network interface unit may be built into a desktop, laptop, handheld or other computer, or may be similarly built into a personal communicator, cell phone or personal digital assistant. In appropriate cases, LAN hubs, switches or network bridges can be combined and used with the inventive network interface unit described herein to reduce the proliferation of interconnecting devices that are required to replicate in-office functionalities.

Configuration data for particular connections will illustratively include two types: (1) files in a network interface unit file system that are specific to each service application, e.g., tunnel configuration information, is advantageously stored in formats and file structures associated with security applications running on the network interface device, such as the above-cited Freeswan security software. DHCP server and DNS will illustratively be of this type. Connection profiles, on the other hand, are advantageously stored in a single flat file, illustratively of the following type

| | |
|---|---|
| T | tom@worldnet (fp) |
| t | dial |
| i | 987654321@worldnet.att.net |
| w | c*m!cb@@KSw3arword! |
| n | 5551212 |
| p | 9 |
| . | |
| T | Anonymous DHCP |
| t | network |
| . | |
| T | @home DHCP |
| t | network |
| c | ZZ-123456X |

In this illustrative arrangement, each profile begins with a T line that contains the profile name. The end of the profile is a line consisting of a single dot (period). Intermediate lines include a tag and related information. These profile lines are advantageously interpreted by scripts behind associated with GUI server 450 as instructions describing how to create configuration files of the first kind. For example, if @home DHCP is selected, the script illustratively writes ZZ-123456X to DHCP client configuration file as the client id, and launches the DHCP client application 415.

The user environment is advantageously set up as a LAN thus accommodating a large range of clients types, and a large range of Internet connection types—all with a minimum amount of user effort. At one end of the client device spectrum are printers, typically having fairly limited configuration possibilities, and which configurations are not easily changed after once being configured. The other end of the device spectrum includes personal computers and other flexible, programmable devices; these can be configured in myriad different ways, but present a user with a high level of configuration complexity. In each case connection to an Ethernet LAN with easily realized configuration and operating features in accordance with present inventive features proves highly attractive.

On the (typically public) network side of the above-described network interface unit (wild side), present inventive teachings present a uniform mechanism for a user to configure a wide variety of connection types, the details of which are not apparent to the client machines. For example, a user may have a preferred broadband service provider, but if broadband service is temporarily unavailable, a dial-up connection can be used in its place, and the client machines will see little effect (other than reduced speed).

It proves advantageous in accordance with embodiments of the present invention to store connection profile information in an encrypted file system that is unlocked by successful authentication of a user. So if a (highly portable network interface unit in accordance with embodiments of the present is lost, stored information is protected from unauthorized use.

What is claimed is:

1. A method practiced at a network interface unit (NIU) directly connected to at least one local area network (LAN), said NIU also being connected to a non-secure node of a second network, which second network is in packet communication with at least one access node of a secure virtual private network (VPN), the method comprising
   receiving data packets from at least one device on said at least one LAN,
   multiplexing said data packets into at least one packet data stream,
   modifying said at least one packet data stream in a security server in said NIU in accordance with a secure communications protocol by encrypting packets in said at least one packet data stream and encapsulating resulting encrypted packets, and
   providing network destination address information from a Domain Name System (DNS) server for at least selected ones of said at least one packet data stream.

2. The method of claim 1 wherein said modifying said at least one packet data stream in a security server comprises modifying said at least one packet data stream in an Internet Protocol security (IPsec) server.

3. The method of claim 2 further comprising
   receiving at least one stream of data packets from said non-secure network,
   filtering out packets in said at least one stream of received data packets that are not from said VPN network, said filtering being performed by a firewall in said security server, said filtering producing at least one filtered stream of received data packets,
   modifying said packets in said at least one filtered stream of received data packets by decrypting said packets in said at least one filtered stream of received data packets and decapsulating resulting decrypted packets to produce decapsulated decrypted packets, said decrypting and decapsulating being performed by said security server,
   demultiplexing at least one stream of decapsulated decrypted received data packets to form at least one demultiplexed stream of said received data packets for delivery to said at least one LAN.

4. The method of claim 3 further comprising
   authenticating client devices on said at least one LAN, and
   wherein packets from authenticated client devices on said at least one LAN that are received at said network interface device are processed as packets received from said VPN.

5. The method of claim 1 wherein said non-secure node of a second network is part of said NIU.

6. The method of claim 5 wherein said at least selected ones of said at least one packet data stream are applied to said non-secure node of said second network.

* * * * *